(12) United States Patent
Taskar

(10) Patent No.: US 7,806,143 B2
(45) Date of Patent: Oct. 5, 2010

(54) FLEXIBLE MANIFOLD FOR INTEGRATED GAS SYSTEM GAS PANELS

(75) Inventor: Mark Taskar, San Mateo, CA (US)

(73) Assignee: Lam Research Corporation, Fremont, CA (US)

( * ) Notice: Subject to any disclaimer, the term of this patent is extended or adjusted under 35 U.S.C. 154(b) by 679 days.

(21) Appl. No.: 11/761,326

(22) Filed: Jun. 11, 2007

(65) Prior Publication Data

US 2008/0302434 A1   Dec. 11, 2008

(51) Int. Cl.
*F16K 11/10* (2006.01)
(52) U.S. Cl. ..................................... 137/884
(58) Field of Classification Search ............... 137/269, 137/270, 271, 597, 884
See application file for complete search history.

(56) References Cited

U.S. PATENT DOCUMENTS

| | | | |
|---|---|---|---|
| 5,819,782 A | 10/1998 | Itafuji | |
| 5,992,463 A | 11/1999 | Redemann et al. | |
| 6,186,177 B1 | 2/2001 | Maher | |
| 6,189,570 B1 | 2/2001 | Redemann et al. | |
| 6,192,938 B1 | 2/2001 | Redemann et al. | |
| 6,283,143 B1 | 9/2001 | Adachi, Jr. et al. | |
| 6,293,310 B1 | 9/2001 | Redemann et al. | |
| 6,302,141 B1 | 10/2001 | Markulec et al. | |
| 6,374,859 B1 | 4/2002 | Vu et al. | |
| 6,394,138 B1 | 5/2002 | Vu et al. | |
| 6,868,867 B2 * | 3/2005 | Yamaji et al. | 137/884 |
| 6,874,538 B2 * | 4/2005 | Bennett | 137/884 |
| 7,152,629 B2 * | 12/2006 | Tokuda et al. | 137/884 |
| 7,299,825 B2 * | 11/2007 | Milburn | 137/884 |
| 7,334,605 B2 * | 2/2008 | Vu | 137/884 |
| 2006/0278835 A1 | 12/2006 | Taskar | |

* cited by examiner

*Primary Examiner*—John Fox
(74) *Attorney, Agent, or Firm*—Beyer Law Group LLP

(57) ABSTRACT

A flexible gas delivery apparatus having a gas panel with a first extension block having a first section and second section, the first section positioned between a mixing valve and the substrate having an exit port in fluid communication with a pump/purge manifold, and a second extension block having a first section and a second section, the first section positioned between a purge valve and the substrate having a discharge port in fluid communication with a mixing manifold, wherein the second portion of the first and second extension blocks extend outwardly from the gas panel.

9 Claims, 13 Drawing Sheets

FLEXIBLE MANIFOLD FOR INTEGRATED GAS SYSTEM GAS PANELS

FIELD OF THE INVENTION

The present invention relates to gas delivery systems. More particularly, the present invention relates to a flexible manifold for gas delivery systems. Even more particularly, the present invention relates to a flexible manifold for integrated gas system (IGS) gas delivery systems.

BACKGROUND OF THE INVENTION

FIG. 1 illustrates a conventional semiconductor etch processing system 100. The conventional semiconductor etch processing system 100 includes a gas source 102, a gas delivery panel 104 connected to the gas source 102 via gas supply lines 106, and a processing chamber 108 connected to the gas delivery system 104. The gas delivery panel 104 further includes gas sticks 110 coupled to the gas supply lines 106. The gas sticks 110 are a series of gas distribution and control components such as a mass flow controller, one or more pressure transducers and/or regulators, a heater, one or more filters or purifiers, and shutoff valves. The components used and their particular arrangement in a gas stick can vary depending upon their design and application, with many component arrangements being known in the art. In a typical semiconductor processing arrangement, over seventeen gases are connected to the chamber via gas supply lines 106, gas distribution components and substrates, mixing manifold. These are attached to a base plate forming a complete system known as "gas panel" or "gas box".

The conventional semiconductor etch processing system 100 depends on the use of several hazardous and non-hazardous processing gases and carefully measured delivery of over seventeen gases from the gas source 102 to the processing plasma chamber 108 via the gas supply lines 106 in a synchronized mode. Such systems usually require gas delivery panel 104 for coupling high purity gases for semiconductor etch processing systems or other thin film coating processes.

In semiconductor manufacturing, processes have become increasingly intolerant of particle contamination as the dimensions of semiconductor devices decrease and there is less room to accommodate more components. One source for particle contamination is the gas stick itself that delivers gases from the source of high purity gases to the semiconductor processing chamber where such particle contaminants commonly get deposited onto the semiconductor devices that are being processed. Another source for particle contamination is the exposure of components in a gas delivery system to room air during maintenance and repair of individual gas delivery components.

One approach to eliminating connection parts, such as tubing and couplers, facilitating maintenance of the components of the gas stick, and to reduce contamination is to "down mount" the components on multiple manifold blocks and then onto a base plate. These are also known as IGS or surface mounted gas delivery systems. However, each component of a gas stick typically comprises highly machined parts, making each component relatively expensive to manufacture and replace. When a component fails, the entire component is replaced even though in most instances the failure is mechanical (and in the case of a mass flow sensor, it is the sensor that usually fails). Each component is typically constructed with a mounting block, which in turn is made with multiple machine operations, making the component expensive. Thus, while down mounting the component parts on multiple fixing blocks solves one problem, it still is relatively expensive to replace defective parts.

Furthermore, gas panels are typically manufactured with three or more gas sticks since manufacturing less gas sticks is expensive, difficult to mount in the gas cabinet, and uses additional parts that may not be necessary to use. Thus, a user has no option other than having a set number of gas sticks. The minimum number of gas sticks is 6 and the standard number of gas sticks is 9. Gas panels having 12 or 16 sticks are possible. However, if a user has a 9 gas stick gas panel installed and wants to add one or two additional gas sticks, the user would be required to buy a gas panel having a minimum of at least three gas sticks. There is no efficient method of connecting a single gas stick to the existing gas panels without removing the entire gas panel, risking contamination, and/or using additional manual effort and time to remove and reinstall the gas delivery components.

Alternatively, should the user have a 9 gas stick gas panel installed and later only needs to use 7 gas sticks, 2 gas sticks would not be used on the gas panel. This would result in excess parts of the gas panel that is not used and removal of the excess gas sticks from the gas panel would not be possible. This situation creates "dead-leg", a section of conduit or manifold through which gas does not flow. Dead-leg is considered to be a source of contamination.

BRIEF DESCRIPTION OF THE INVENTION

A flexible gas delivery apparatus having a gas panel with a first extension block having a first section and second section, the first section positioned between a mixing valve and the substrate having an exit port in fluid communication with a pump/purge manifold, and a second extension block having a first section and a second section, the first section positioned between a purge valve and the substrate having a discharge port in fluid communication with a mixing manifold, wherein the second portion of the first and second extension blocks extend outwardly from the gas panel.

In another embodiment, the flexible gas delivery apparatus may have a manifold extension block with a plurality of input ports, each plurality of input ports in fluid communication with the substrate, a horizontal common manifold pathway, a plurality of output ports, each plurality of output ports in fluid communication with the common manifold pathway; and a plurality of vertical tube ports configured to receive a tube, each of the plurality of vertical tube ports positioned substantially between each of the plurality of input ports, each of the vertical tube ports in fluid communication with the common manifold pathway.

These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
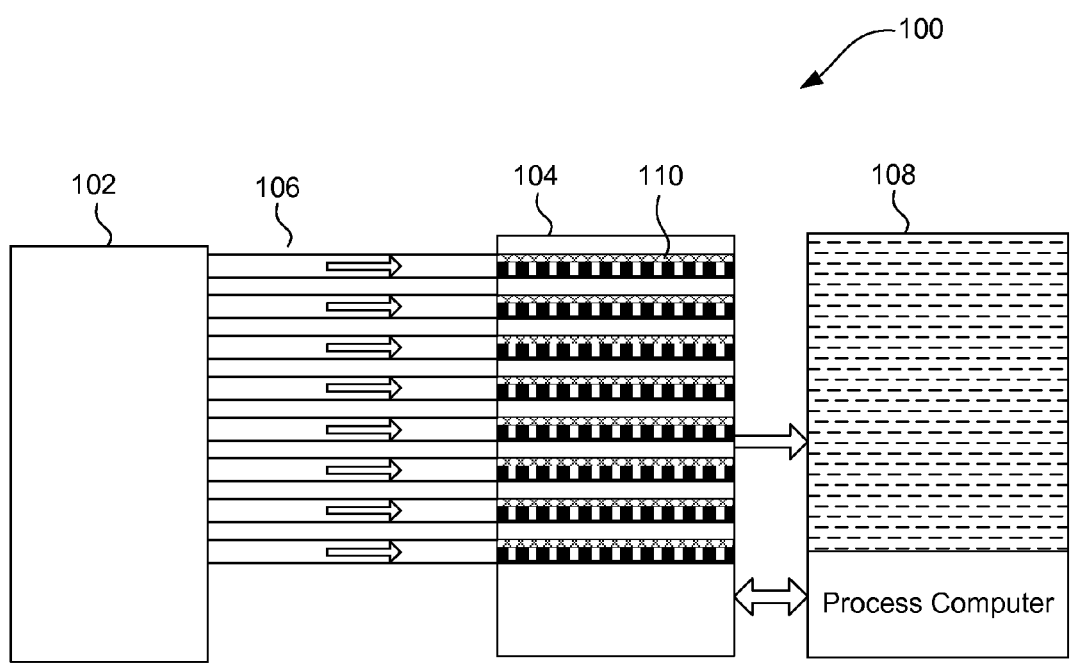
FIG. 1 illustrates a conventional semiconductor etch processing system.
Figure 2:
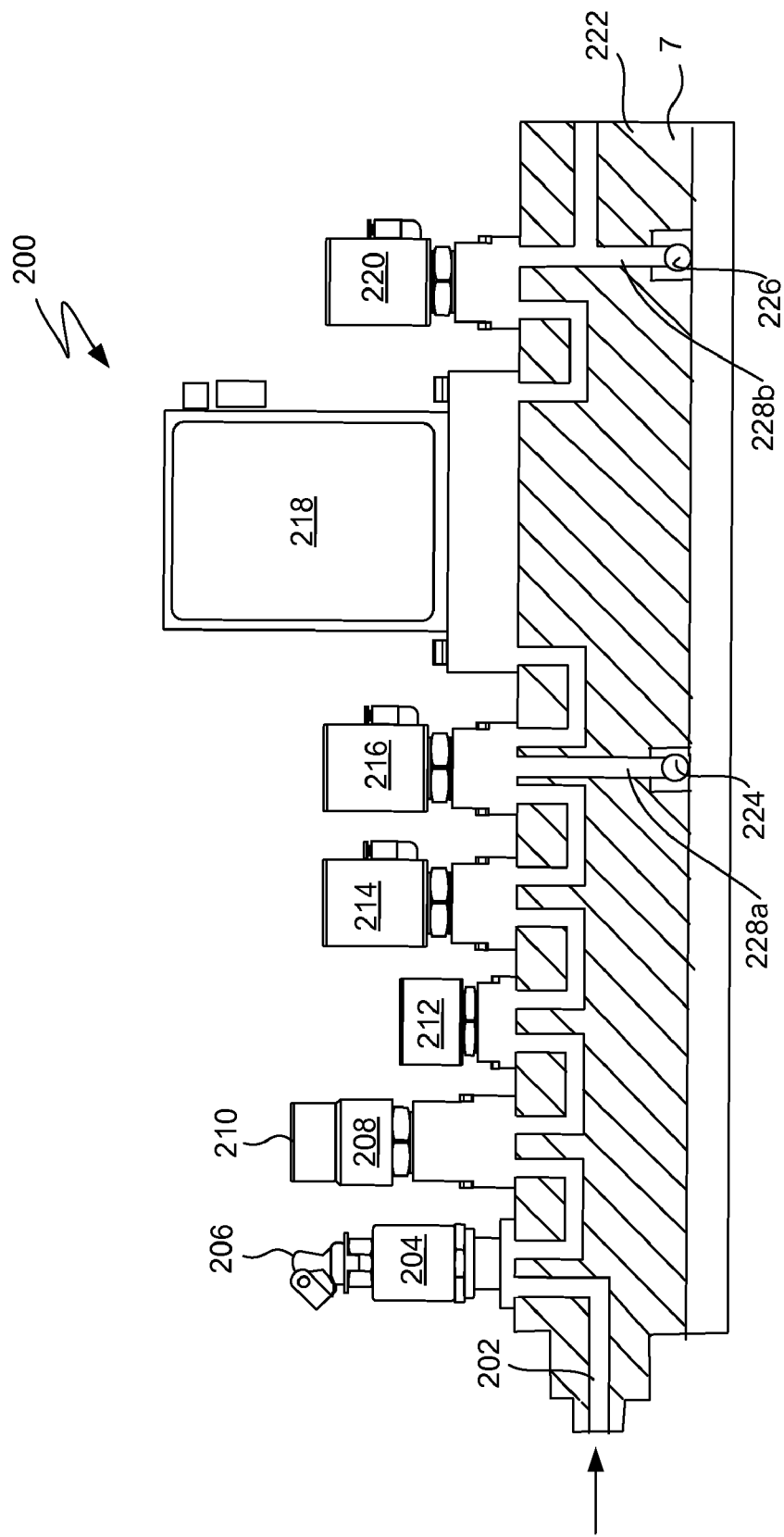
FIG. 2 illustrates an exemplary gas stick.

The present invention provides for a flexible gas delivery manifold. FIG. 2 illustrates an exemplary gas stick. Although illustrated with certain components, the specific components are not intended to be limiting as different components may be used and/or less or more components may be used to form the gas stick. Additionally, although described with a single gas stick, the number of gas sticks is not intended to be limiting. As discussed above, a plurality of gas sticks, form a gas box or panel. In an embodiment, the valve on the components is an integrated surface mount valve. In general, an integrated surface mount component is a gas control component (e.g., valve, filter, etc.) that is connected to other gas control components through channels on a substrate assembly, upon which the gas control components are mounted. This is in contrast to gas control components that are generally attached through bulky conduits with VCR attachments (vacuum coupled ring).

The gas stick 200 may have a gas stick input port 202 to input a supply gas. A manual valve 204 may be used for carrying out the supply or isolation of the supply of supply gas. The manual valve 204 may also have a lockout/tagout device 206 above it. Worker safety regulations often mandate that plasma processing manufacturing equipment include activation prevention capability, such as a lockout/tagout mechanism. Generally a lockout is a device that uses positive means such as a lock, either key or combination type, to hold an energy-isolating device in a safe position. A tagout device is generally any prominent warning device, such as a tag and a means of attachment that can be securely fastened to energy-isolating device in accordance with an established procedure.

A regulator 208 may be used to regulate the gas pressure or the supply gas and a pressure gauge 210 may be used to monitor the pressure of the supply gas. In one embodiment, the pressure may be preset and not need to be regulated. In another embodiment, a pressure transducer (not illustrated) having a display to display the pressure may be used. The pressure transducer may be positioned next to the regulator 208. A filter 212 may be used to remove impurities in the supply gas. A primary shut-off valve 214 may be used to prevent any corrosive supply gasses from remaining in the gas stick. The primary shut-off valve 214 may be two-port valve having an automatic pneumatically operated valve assembly that causes the valve to become deactivated (closed), which in turn effectively stops plasma gas flow within the gas stick. Once deactivated, a non-corrosive purge gas, such as nitrogen, may be used to purge the gas stick. The purge valve 216 may have three-ports to provide for the purge process—an entrance port, an exit port and a discharge port.

Adjacent the purge valve 216 may be a mass flow controller ("MFC") 218. The MFC 218 accurately measures the flow rate of the supply gas. Positioning the purge valve 216 next to the MFC 218 allows a user to purge any corrosive supply gasses in the MFC 218. A mixing valve 220 next to the MFC 218 may be used to control the amount of supply gas to be mixed with other supply gasses on the gas panel.

Each component of the gas stick may be positioned above a manifold block. A plurality of manifold blocks form a substrate 222, a layer of manifold blocks that creates the flow path of gasses through the gas stick 200. The gas delivery components may be positioned on the manifold blocks by any known means such as with a pressure fitting sealant (eg., C-seal) and the like.

Figure 3A:
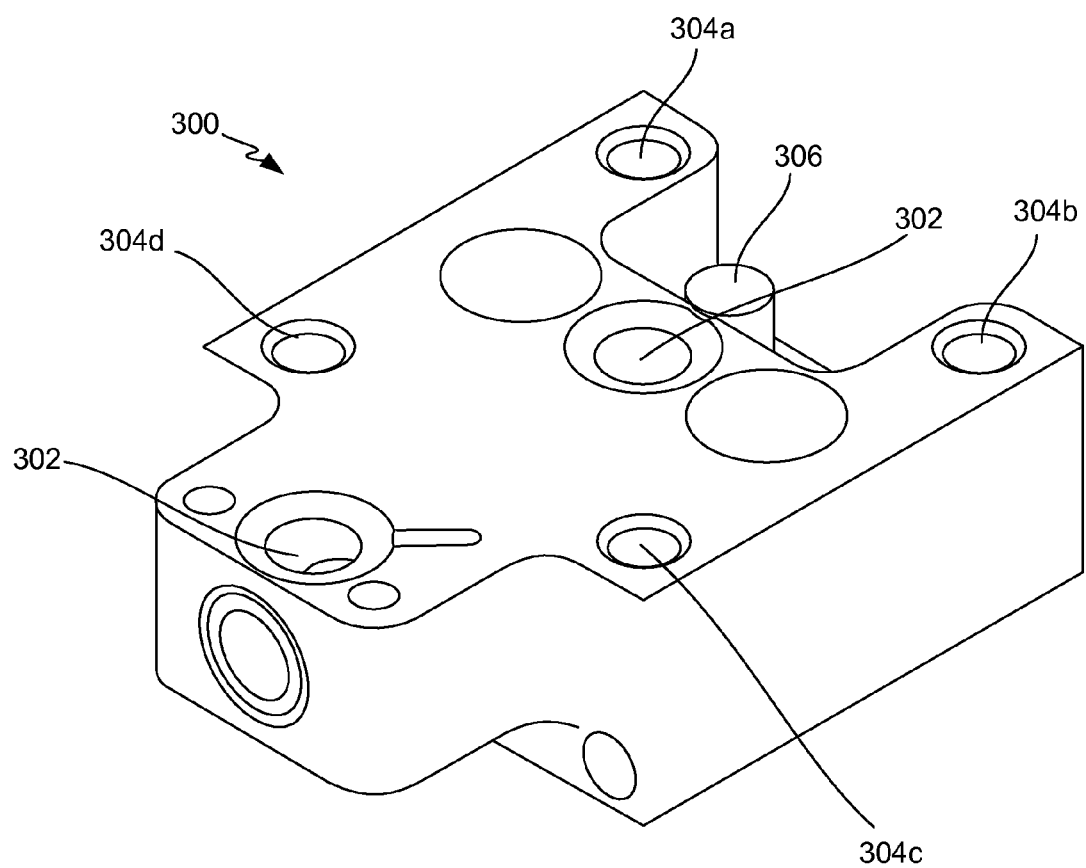
FIGS. 3A, 3B, 3C and 3D illustrate exemplary manifold blocks.

FIGS. 3A, 3B, 3C and 3D illustrate exemplary manifold blocks. Referring to FIG. 3A, manifold block 300 may have component ports 302 configured to receive gas stick components. The manifold block 300 may be coupled to a base plate via apertures 304a, 304b, 304c, 304d. A plurality of manifold blocks may be removably coupled to each other via manifold connector 306 to form a substrate. Thus, although illustrated with one manifold block, the number is not intended to be limiting as any number of manifold blocks may be used as necessary. The manifold block may be formed from a stainless steel material such as 316L vacuum induction melting or vacuum arc re-melting stainless steel.

Figure 3B:
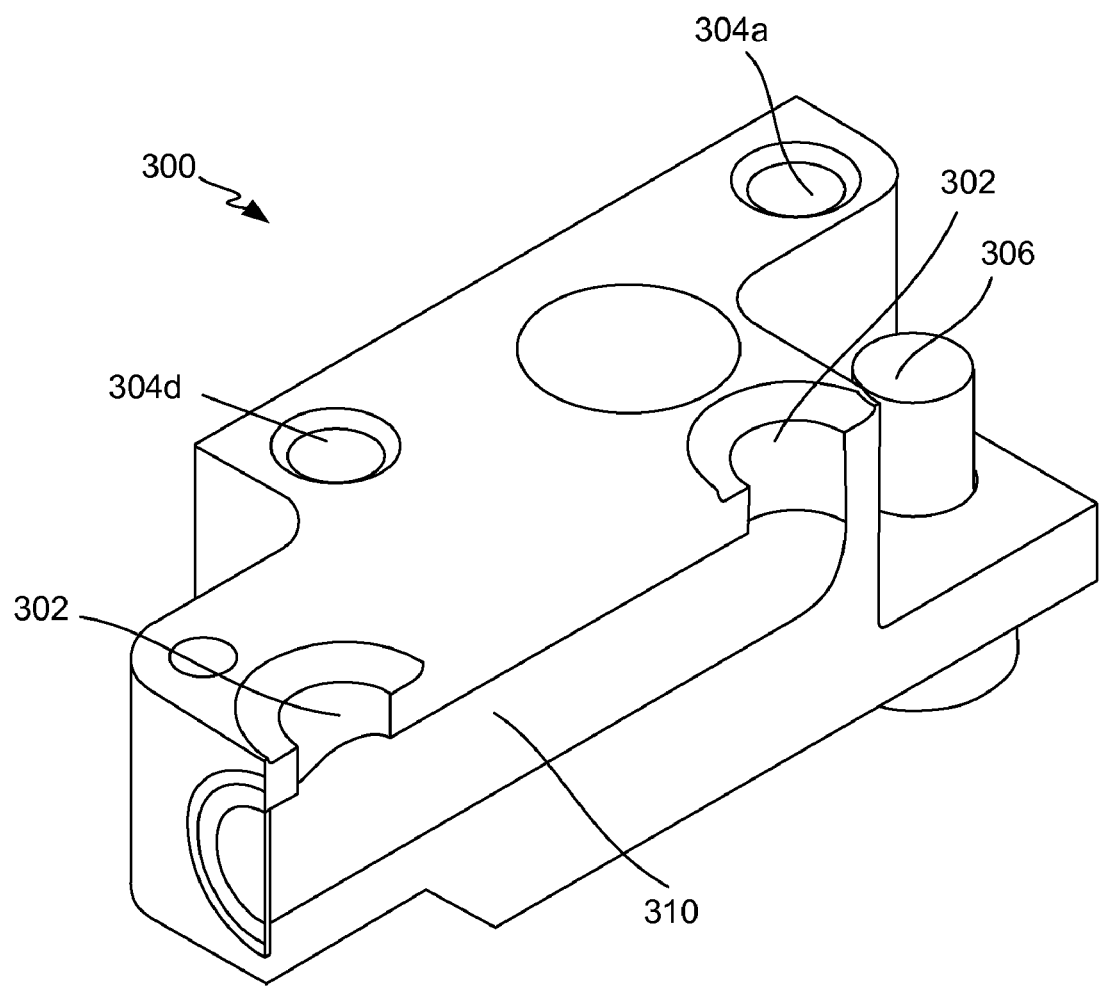

FIG. 3B illustrates a cut-away view of FIG. 3A. Gas passageways may be provided in each of the manifold blocks to fluidly connect each of the gas stick components. The gas passageway may be a horizontal passageway. However, as illustrated below, the passageway may be formed with a "V", "U" or any other shape.

Figure 3C:
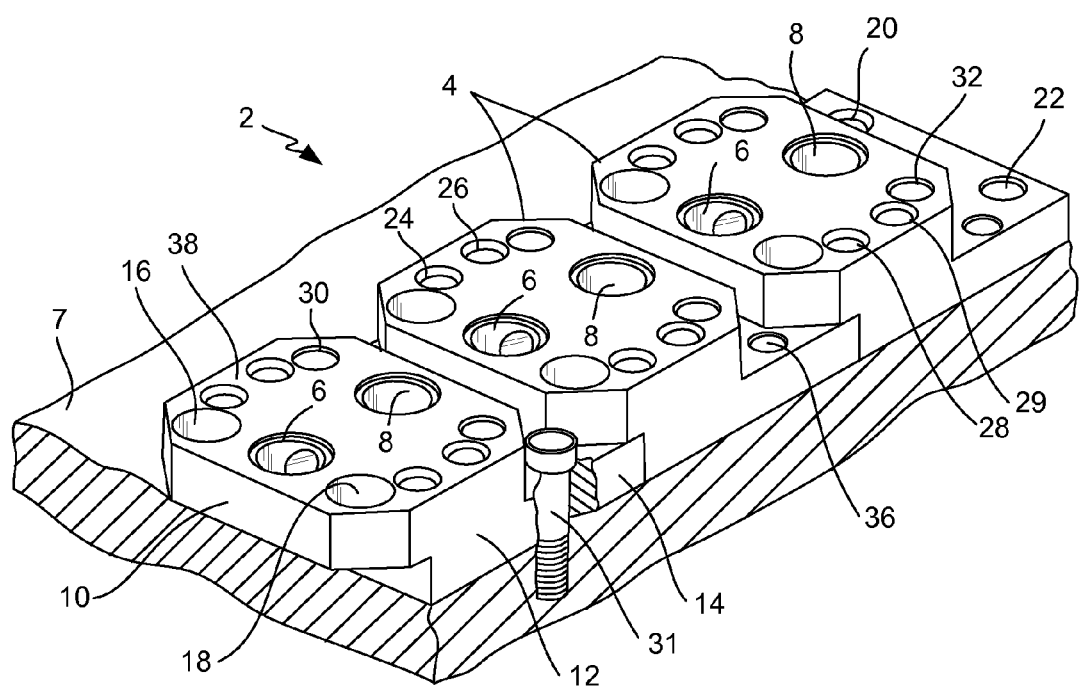

FIG. 3C illustrates another exemplary manifold block. Manifold assembly 2 may be mounted on a base plate 7 by combining individual manifold blocks to form an operative system. Each of the three manifold blocks 4 may be formed from a stainless steel material such as 316L vacuum induction melting or vacuum arc re-melting stainless steel. Although illustrated with three manifold blocks, the number is not intended to be limiting as any number of manifold blocks may be used as necessary. Gas passageways may be provided in each of the manifold blocks and as shown in FIG. 3C, the passageways may have access ports positioned on a common upper surface 38. For ease of description, the flow path will be considered to extend from left to right although it could just as easily be reversed and, accordingly, the entrance port 6 is shown on the upper surface 38 along with an exit port 8. The entrance port 6 may be partially on an upper flange member 10 that is cantilevered from a central manifold body portion 12. A lower flange member 14 may be dimensioned to have a complimentary configuration to match the upper flange member 10 of the immediately adjacent manifold block. Each of the gas delivery components illustrated in FIG. 2 may be bridged across an entrance port 6 on one manifold block 4 to an exit port 8 on the adjacent manifold block 4. While not shown in any of the drawings of the present application, the gas stick may be mounted in a sealed housing for safety purposes and to control the purging of any leaking gases from the gas delivery system.

Figure 3D:
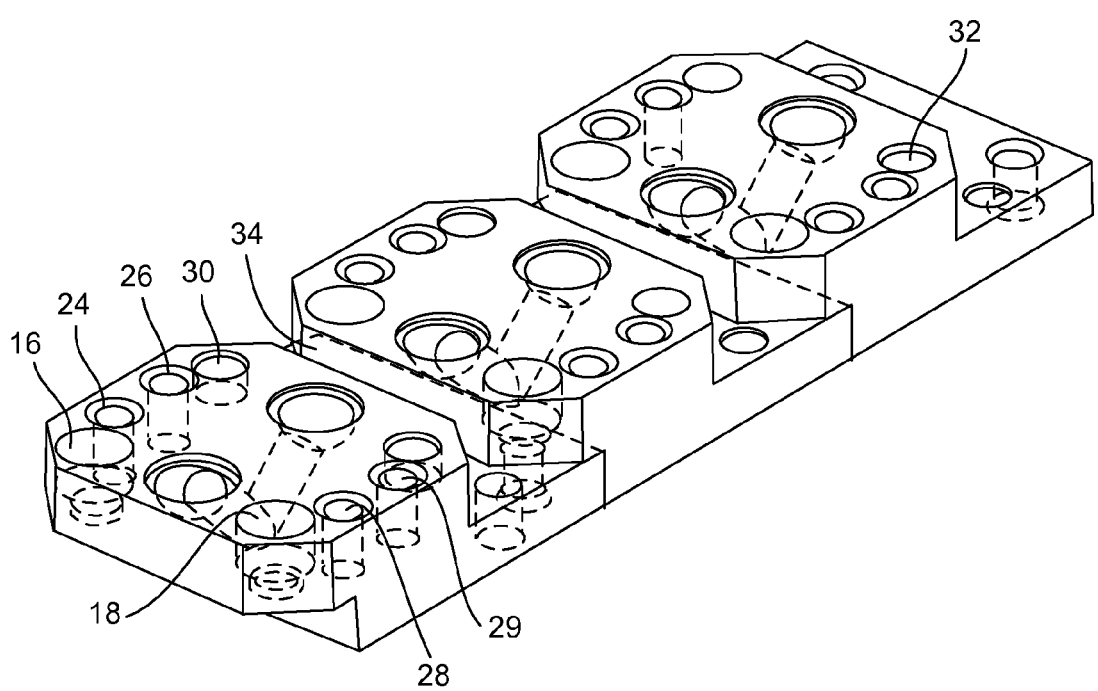

Referring to FIG. 3D, V-shaped gas passages between an entrance port 6 and an exit port 8 may be seen in the phantom lines. Although illustrated as V-shaped, any shape may be used such as U-shaped passages as illustrated below. A pair of appropriate boreholes 16 and 18 on an upper flange member 10 may have a lower beveled surface to enable self-aligning of any bolt fasteners. The respective bores 16 and 18 appropriately align with threaded apertures 20 and 22 on the lower flange member 14 of an adjacent manifold block.

A pair of threaded bores 24 and 26 and 28 and 29 may be provided on each perimeter side to enable the fastening of a flange on a gas stick component. Finally, a pair of recesses 30 and 32 on opposite sides may also be provided to accommodate any protrusion of screws for fastening a pressure sealer to the bottom of a gas stick component. The bore opening 16 and 18 may have sufficient depth that when an appropriate fastener is sealed, there may be sufficient vertical room above a fastener to accommodate the protruding head of any fastening screw or bolt associated with the pressure sealer.

Again, as seen in FIGS. 3C and 3D, apertures 34 and 36 may be provided on either side of the lower flange members 14 to thereby accommodate a fastener 31 for attachment to the base plate 7. The upper flange member 10 may be appropriately tapered or cut to facilitate access, for example, by an Allen wrench, to any such fasteners 31.

Thus, a plurality of manifold blocks 4 may have specific upper flange members 10 and lower flange members 14 that are cantilevered from a central manifold body portion 12 to enable the individual manifold blocks to be interconnected to accommodate a specific fluid distribution system. Each of the manifold blocks 4 may have a fluid passageway with an entrance port 6 and an exit port 8 that access a common upper surface 38. The dimensions of the upper flange member 10 and the lower flange member 14 may be such that they extend across each other and thereby provide means for removably interlocking a pair of adjacent manifold blocks 4 to operatively permit their respective fluid passageways to be positioned for interconnection.

Referring back to FIG. 2, as stated above, the lower surface of the substrate 222 may be removably coupled to a base plate 7. The substrate 222 may have a plurality of fluid passageways 228a, 228b in fluid communication with a pump/purge manifold 224 and a mixing manifold 226 on top of the base plate 7. The pump/purge manifold 224 may be used to purge corrosive gasses from the gas stick 200. The mixing manifold 226 may be in fluid communication with the mixing valve and used to mix the gases in any quantity desired by a user.

As stated above, single gas sticks are expensive to manufacture, difficult to mount in the gas cabinet, and uses additional parts that may not be necessary to use which may lead to contamination. However, with an extension block, single gas sticks may be joined to an existing gas panel efficiently and quickly. The use of the extension block makes joining a single gas stick less expensive, easy to mount in the gas cabinet, and does not use excess parts. The extension block may be positioned to operatively permit their respective fluid passageways to be positioned for interconnection with the pump/purge manifold 224 and the mixing manifold 226. Thus, only the purge and mixing valves need to be removed when joining a single gas stick.

Figure 4A:
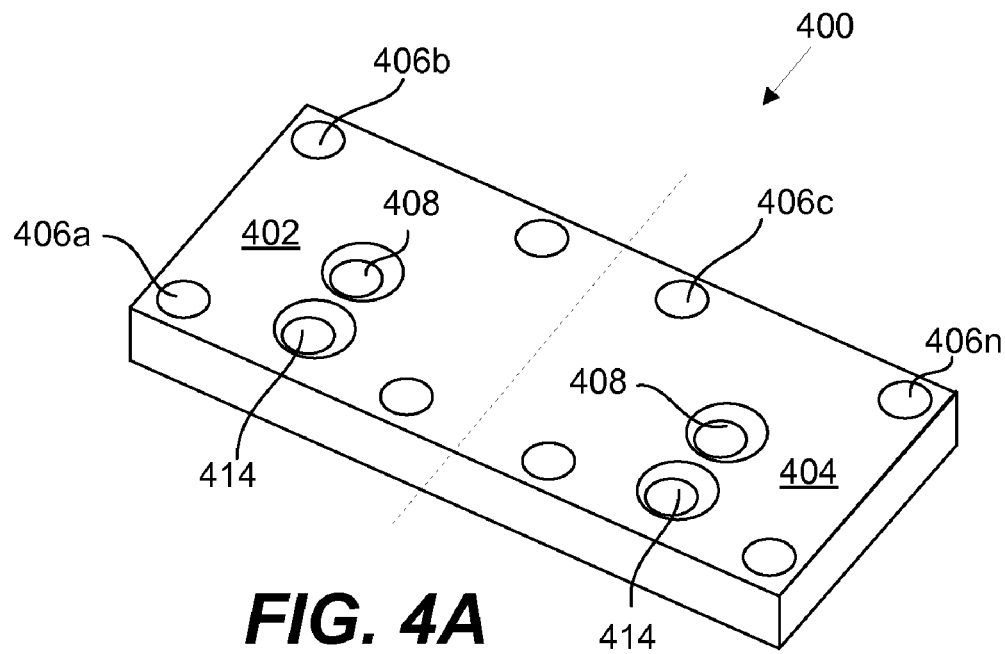
FIGS. 4A-4D illustrate an embodiment of manifold extension block.
Figure 4B:
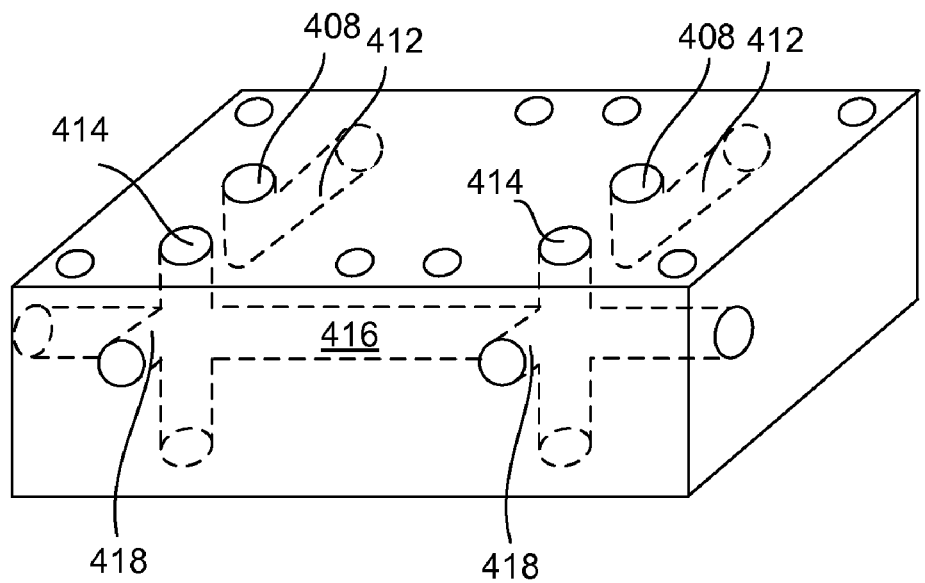

FIGS. 4A-4D illustrate an embodiment of manifold extension block. Referring now to FIGS. 4A and 4B, an embodiment of a manifold extension block having two ports. The extension block 400 may be a single machined block having a first section 402 and a second section 404. Although illustrated with only two sections, the number of sections is not intended to be limiting as the extension block may manufactured to have a longer length and a plurality of sections to join a plurality of single gas sticks.

For exemplary purposes only and not intended to be limiting, the two-port manifold extension block 400 will be discussed in use with the mixing valve. The manifold extension block 400 may have a plurality of apertures 406a, 406b, 406c, 406n (where n is an integer) to removably couple the mixing valve to the extension block 400 and the extension block 400 to the base plate 7 (See FIG. 2). The extension block 400 may have an entrance port 408 and an exit port 414. The entrance port 408 may be in fluid communication with one of the gas delivery components, such as the MFC and it respective manifold block, via horizontal passageway 412 to receive the supply gas from the MFC. The exit port 414 may extend vertically through fluid passageway 228b in the substrate 222 so that it is in fluid communication with the mixing manifold 226. The exit port 414 may be in fluid communication with a horizontal passageway 416 which may form a secondary mixing manifold. The exit port 414 may also be in fluid communication with discharge port 418 to remove any unnecessary gasses. It will now be known that any of the horizontal fluid passageways may be removably sealed or plugged when not in use. For example, if discharge port 418 is not in use, the port may be plugged so that there will be less dead leg in the gas stick. In another example, if the user does not want the exit port 414 to extend vertically into the fluid passageway 228b in the base plate 7 (See FIG. 2), the user may simply plug the exit port 414 to prevent gasses from entering fluid passageway 228b.

Figure 4C:
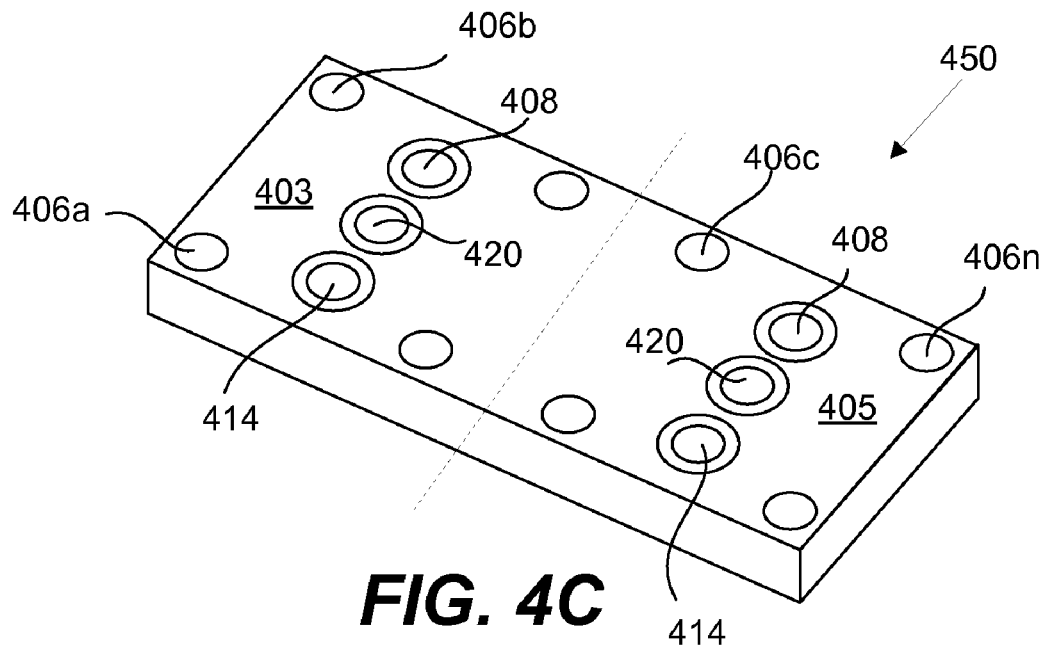
Figure 4D:
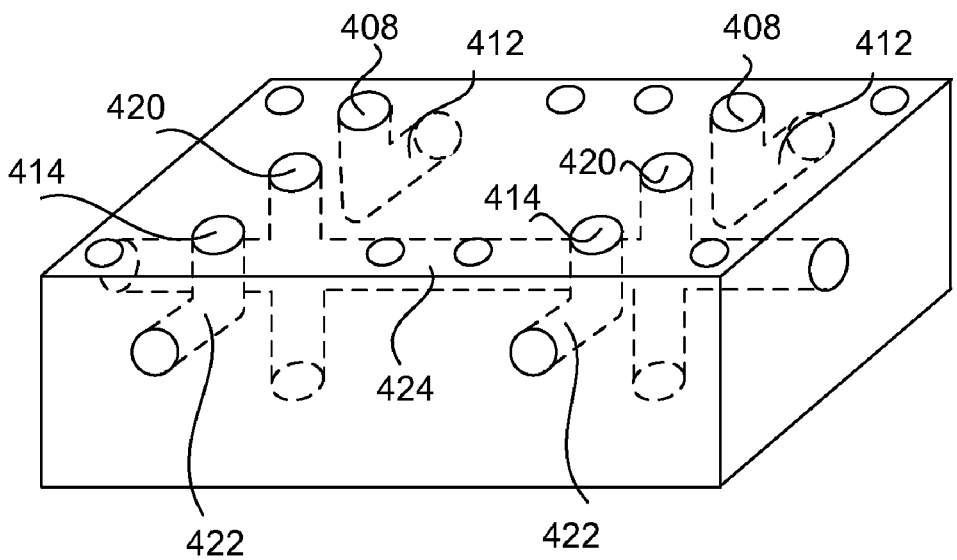

FIGS. 4C and 4D illustrate another embodiment of an extension block described in use with the purge valve. The extension block 450 may be a single machined block having a first section 403 and a second section 405. Although illustrated with only two sections, the number of sections is not intended to be limiting as the extension block may manufactured to have a longer length and a plurality of sections to join a plurality of single gas sticks. The extension block 450 may have three ports—an entrance port 408, exit port 414, and discharge port 420. The entrance port 408 may be in fluid communication with one of the gas delivery components, such as the primary shut-off valve and it respective manifold block, via horizontal fluid passageway 412. Exit port 414 may be in fluid communication with the MFC via horizontal fluid passageway 422. Discharge port 420 may extend vertically downward to be in fluid communication with fluid passageway 228a in the substrate 222, which is in fluid communication with the pump/purge manifold 224. Discharge port 420 may also be in fluid communication with a horizontal passageway 424 which forms a secondary pump/purge manifold.

Figure 5A:
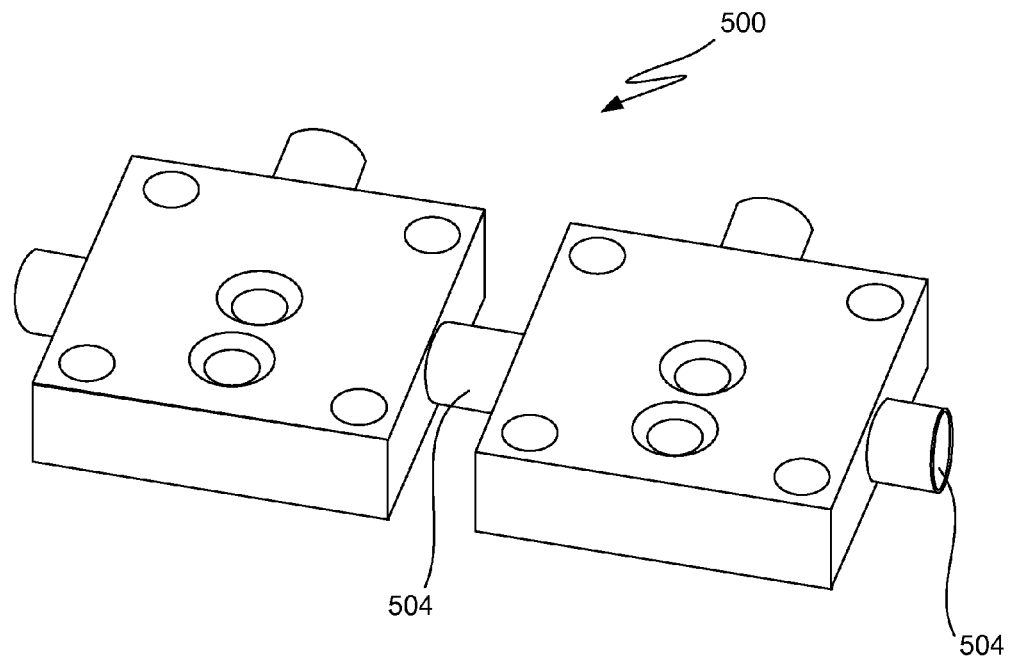
FIGS. 5A and 5B illustrates yet another embodiment of an extension block.
Figure 5B:
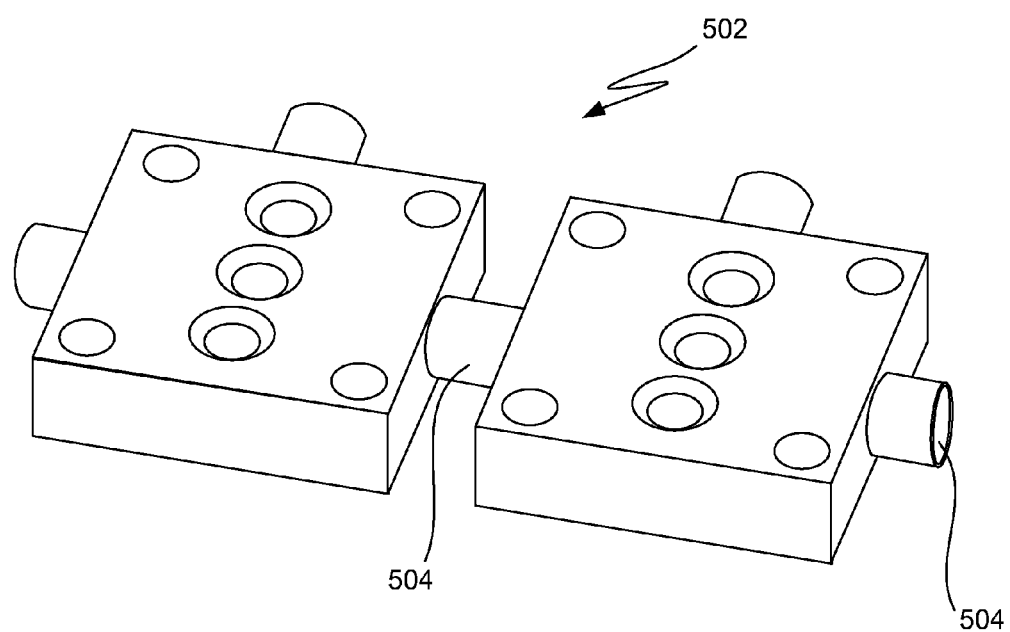

FIGS. 5A and 5B illustrates yet another embodiment of an extension block. FIG. 5A illustrates a two port manifold extension block 500 and FIG. 5B illustrates a three port manifold extension block 502. The extension blocks illustrated in FIGS. 5A and 5B are similar to the extension blocks described in FIGS. 4A-4D. However, the extension blocks illustrated in FIGS. 5A and 5B may not be made of one single machined piece. The extension blocks may be connected via horizontal fluid passageway 504. Thus, unlike the one-piece extension block illustrated in FIGS. 4A-4D, these embodiments gives a user flexibility to connect as many extension blocks as needed. The horizontal fluid passageways 504 may be connected through any means known to prevent any gas leakage.

Figure 6:
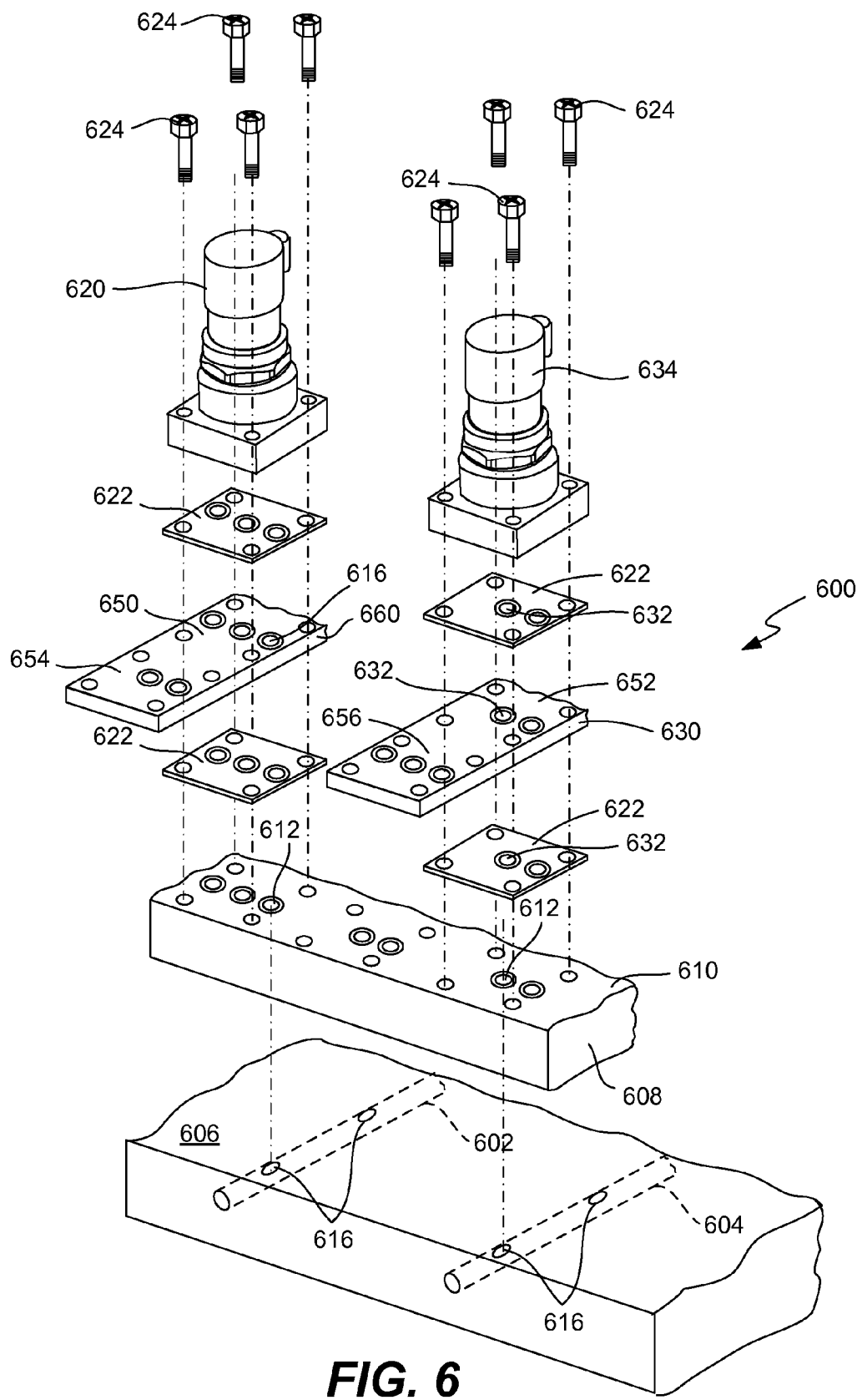
FIG. 6 illustrates the extension blocks in use with an IGS gas delivery system.

FIG. 6 illustrates the extension blocks in use with an IGS gas delivery system. In one embodiment as illustrated, a purge manifold 602 and a mixing manifold 604 may be placed within the base plate 606 parallel to each other. In another embodiment as illustrated in FIG. 2, the purge manifold 602 and the mixing manifold 604 may be placed on top of the base plate 7. In either embodiment, the pump/purge manifold 602 and/or the mixing manifold 604 may be any means to allow for the flow of gasses, such as a tubing and the like. The pump/purge manifold 602 and the mixing manifold 604 may have a plurality of apertures 614 to be in fluid communication with a second plurality of apertures 612 in the substrate 608. The substrate 608 may be coupled to the base plate by an connecting means such as a screw, and the like. A first section 650 of the purge manifold extension block 660 may be removably coupled on the substrate 608 with a pressure sealer 622. The discharge port 616 may be in fluid communication with one of the second plurality of apertures 612 in the substrate 608. This allows the discharge port 616 to be in fluid communication with the pump/purge manifold 602 on the base plate 606. The purge valve 620 may be placed above the purge manifold extension block 660. The purge valve 620 may be secured to the purge manifold extension block 660 with a pressure sealer 622. Any fastening means, such as screws 624, may be used to secure the purge valve 620 to the base plate 606. The second section 654 of the purge manifold extension block 660 may extend outwardly from the substrate 608 and configured to receive additional gas components.

The first section of a mixing manifold extension block 630 may be similarly coupled to the gas panel. The first section 652 of the mixing manifold extension block 630 may be positioned on the upper surface 610 of the substrate 608 with a pressure sealer 622. The exit port 632 may be in fluid communication with one of the second plurality of apertures 612 in the substrate 608. This allows the exit port 632 to be in fluid communication with the mixing manifold 604 on the base plate 606. The mixing valve 634 may be placed above the mixing manifold extension block 630. The mixing valve 634 may be secured to the mixing manifold extension block 630 with a pressure sealer 622. Any fastening means, such as screws 624, may be used to secure the mixing valve 630 to the base plate 606. The second section 656 of the mixing manifold extension block 630 may extend outwardly from the substrate 608 and be configured to receive other gas delivery components.

Thus, extending the existing purge and mixing manifold is not necessary as the secondary manifold in the extension block may replace the need for a new manifold. This reduces the amount of material and cost to make the single gas stick. Furthermore, the use of the extension blocks allows for the flexibility in adding and/or removing as many single gas sticks as desired.

Although illustrated with the use of two extension blocks on one gas stick, it will now be known that other extension blocks may also be positioned on the last gas stick of the gas panel 600.

Figure 7A:
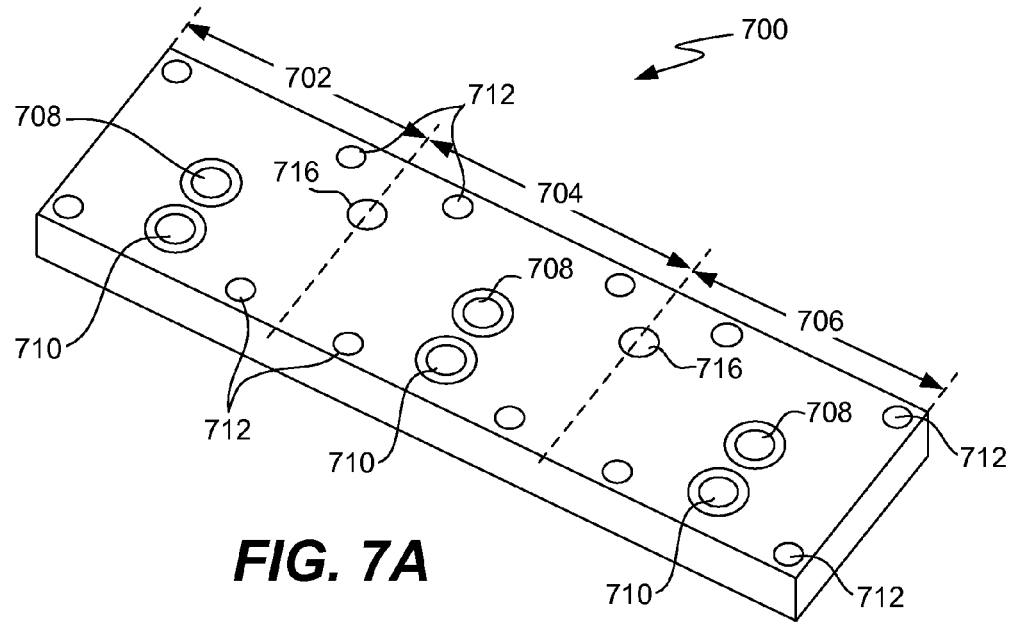
FIGS. 7A and 7B illustrate yet another embodiment of an extension block.
Figure 7B:
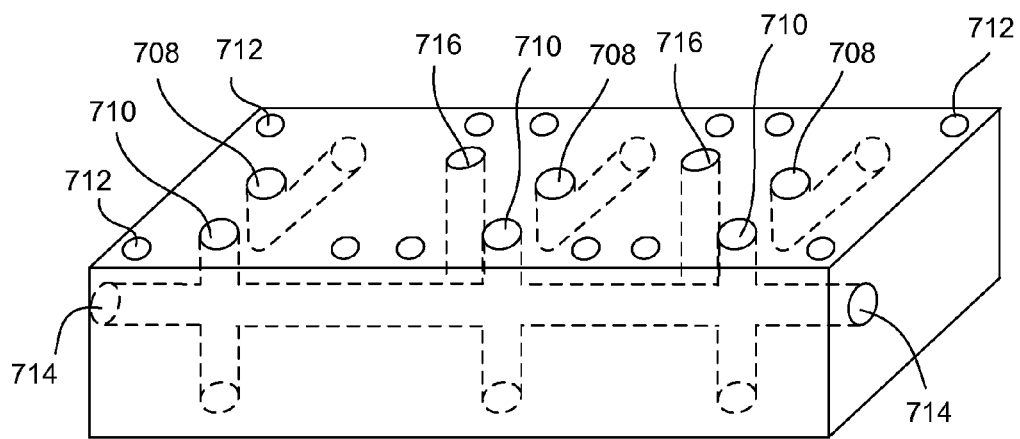

FIGS. 7A and 7B illustrate yet another embodiment of an extension block. The extension block 700 may have a first section 702, a second section 704, and a third section 706. Although illustrated with three sections, the number of sections is not intended to be limiting as the extension block may have a plurality of sections a desired. Each section may have an entrance port 708, an exit port 710, and a plurality of apertures 712 for removably coupling the extension block to the base plate. The entrance port 708 may be in fluid communication with a gas stick component, such as the MFC, via the manifold block illustrated in FIGS. 3C and 3D. The exit port 710 may be in fluid communication with a common manifold pathway 714 and the mixing manifold via the base plate (not illustrated).

The extension block 700 may also have a tubing port 716 positioned between each of the sections. As illustrated in FIGS. 7A and 7B, the tube port 716 is positioned between the first section 702 and the second section 704 and between the second section 704 and the third section 706. The tube port 716 may be in fluid communication with the common manifold pathway 714.

The tube port 716 may be configured to receive a vertical tube or pipe able to be positioned between two of the gas delivery components, such as between two mixing valves. There is currently no method in which to add an additional component between two existing gas delivery components due to the small real estate available on the gas stick. However, the use of a vertical tube is possible and may be used as an additional test port to ensure the gas flow is proper, a sample port to insert sample gasses for testing, an extra purge port, and/or to reassign and/or redirect gas lines to reduce dead leg or redirect the flow of the gasses.

In one embodiment, the extension block 700 may be fluidly coupled to the gas panel as discussed above with reference to the exemplary embodiments of extension blocks described above. Thus, sections of the extension block may extend outwardly from the gas panel to allow for the removable connection to additional gas delivery components.

Figure 8:
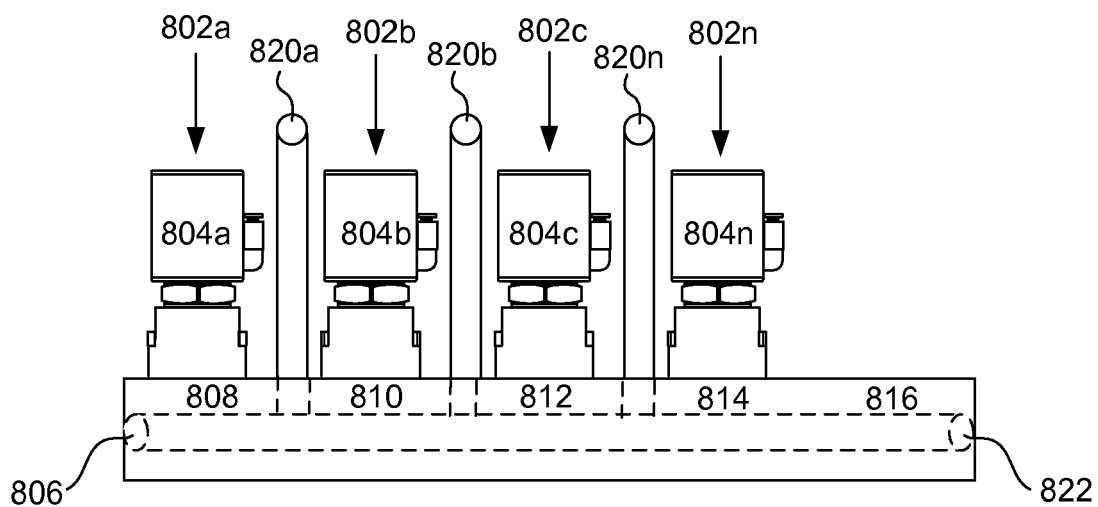
FIG. 8 illustrates a side view of one end of an exemplary gas panel.

In another embodiment, the extension block may be used in place of the mixing manifold 226. FIG. 8 illustrates a side view of one end of an exemplary gas panel. The gas panel 800 may have a plurality of gas sticks 802a, 802b, 802c, 802n, each having a mixing valve 804a, 804b, 804c, 804n. The mixing valves 804a, 804b, 804c, 804n, may be in fluid communication and removably coupled to the extension block 806 having a first section 808, a second section 810, third section 812, a fourth section 814, and an n-section 816. As illustrated, the n-section 716 extends beyond the gas stick 800 to allow for the removable connection of additional gas delivery components. Vertical tubes 820a, 820b, 820c, 820n may extend upwardly from the extension block 806 between each mixing valve 804a, 804b, 804c, 804n. Vertical tubes 820a, 820b, 820c, 820n may be in fluid communication with a common manifold pathway 822 in the extension block 806. The common manifold pathway 822 may replace the need for another mixing manifold. This would create a more efficient gas panel as less material would be required, the cost to manufacture is less, and there is less dead leg.

It will now be known to those skilled in the art that any number of extension blocks may be used to allow for greater flexibility. For example, a single extension block may be used for gas sticks 802b, 802c in the center of the gas panel. A second extension block may be positioned on the first gas stick 802a and a third extension block may be use positioned on the last gas stick 802n. Both extension blocks may extend outwardly from the first gas stick 802a and the last gas stick 802n to allow for the addition of additional gas delivery components. This allows for the flexibility and ease of removing or adding multiple single gas sticks to the existing gas panel.

Figure 9:
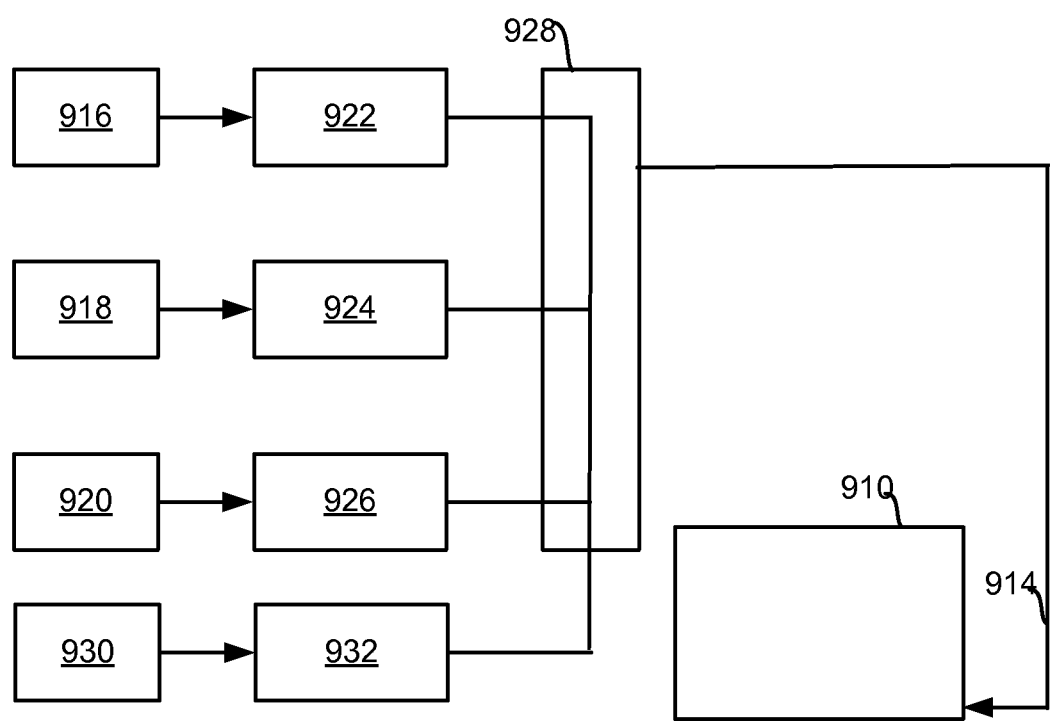
FIG. 9 is a schematic view of an exemplary gas feed device for semiconductor processing.

FIG. 9 is a schematic view of an exemplary gas feed device for semiconductor processing. A plasma processing chamber 910 is supplied processing gas through gas supply line 914. The gas supply line 912 may provide process gas to a showerhead or other gas supply arrangement arranged in the upper portion of the chamber. Additionally, gas supply line 914 may supply processing gas to a lower portion of the chamber such as, for example, to a gas distribution ring surrounding the substrate holder or through gas outlets arranged in the substrate support. However, an alternative dual gas feed arrangement can supply gas to the top center and top perimeter of the chamber. Processing gas may be supplied to gas line 914 from gas supplies 916, 918, 920, 930 the process gasses from supplies 916, 918, 920, 930 being supplied to MFC 922, 924, 926, 932 respectively. The MFC 922, 924, 926, 932 supply the process gasses to a mixing manifold 928 after which the mixed gas is directed to gas flow line 914.

In operation, the user may select the fraction of mixed flow to be delivered to the plasma processing chamber. For example, the user might select a flow of 250 sccm Ar/30 sccm $C_4F_8$/15 sccm $C_4F_6$/22 sccm $O_2$ delivered through line 914. By comparing the total flow, which in this case could be measured by summing all of the flow readouts of the MFC 922, 924, 926, 932 in the gas box, the controller can adjust the degree of throttling in line 914 to achieve the desired flow distribution. Alternatively, an optional total flow meter could be installed just downstream of the mixing manifold 928 to measure the total flow of mixed gas, rather than determining the total flow by summing the readouts of the MFCs 922, 924, 926, 932 in the gas box.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A flexible gas delivery apparatus, comprising:
   a gas panel having a first gas stick and a last gas stick, each of the gas sticks having a plurality of gas delivery components thereon;
   a plurality of manifold blocks interconnected to form a substrate, each of the plurality of manifold blocks coupled to one of the plurality of gas delivery components;
   a base plate having an upper surface and a lower surface, the upper surface of the base plate coupled to a bottom surface of the substrate;
   a mixing manifold positioned at the upper surface of the base plate to connect a plurality of mixing valves on the substrate in parallel; and
   a pump/purge manifold positioned on the upper surface of the base plate to connect a plurality of pump/purge valves on the substrate in parallel;
   wherein the first gas stick further comprises:
      a first extension block having a first section and a second section, the first section positioned between a purge valve and the substrate having a discharge port in fluid communication with the pump/purge manifold,
      a second extension block having a first section and second section, the first section positioned between a mixing valve and the substrate having an exit port in fluid communication with the mixing manifold; and
      wherein the second portion of the first and second extension blocks extend outwardly from the gas panel.

2. The apparatus of claim 1, wherein the mixing manifold is a mixing manifold and the pump/purge manifold is a purge manifold.

3. The apparatus of claim 1, wherein the last gas stick further comprises:
   a third extension block having a first section and second section, the first section positioned between a mixing valve and the substrate having an exit port in fluid communication with the mixing manifold; and
   a fourth extension block having a first section and a second section, the first section positioned between a purge valve and the substrate having a discharge port in fluid communication with the pump/purge manifold,
   wherein the second portion of the third and fourth extension blocks extend outwardly from the gas panel configured to be fluidly coupled to a second single gas stick.

4. The apparatus of claim 3, wherein the third extension and fourth extension blocks further comprise a plurality of sections coupled to the second section.

5. The apparatus of claim 3, wherein each section of the first extension block and the third extension block further comprises:
   an entrance port in fluid communication with the substrate,
   wherein the exit port accesses a horizontal secondary manifold in the extension block.

6. The apparatus of claim 3, wherein each section of the second extension block and the fourth extension block further comprises:
   an entrance port and exit port in fluid communication with the substrate,
   wherein the discharge port accesses a horizontal secondary manifold passageway in the extension block.

7. The apparatus of claim 1, wherein the first extension and second extension blocks further comprise a plurality of sections coupled to the second section.

8. The apparatus of claim 1, wherein the base plate further comprises:
   a first plurality of input/output ports in fluid communication with the plurality of mixing valves and the exit port; and
   a second plurality of input/output ports in fluid communication with the plurality of purge valves and the discharge port.

9. The apparatus of claim 1, wherein the mixing manifold is parallel to the pump/purge manifold.

* * * * *